United States Patent
Yonekura et al.

(10) Patent No.: US 7,143,596 B2
(45) Date of Patent: Dec. 5, 2006

(54) AIR CONDITIONING DEVICE FOR VEHICLE

(75) Inventors: Takahiro Yonekura, Utsunomiya (JP);
Shigetaka Kuroda, Utsunomiya (JP);
Teruo Wakashiro, Shioya-gun (JP);
Kohei Hanada, Utsunomiya (JP);
Makoto Kishida, Frankfurt am Main (DE)

(73) Assignee: Honda Motor Co. Ltd., Tokyo (JP)

( * ) Notice: Subject to any disclaimer, the term of this patent is extended or adjusted under 35 U.S.C. 154(b) by 149 days.

(21) Appl. No.: 10/522,579

(22) PCT Filed: Apr. 21, 2003

(86) PCT No.: PCT/JP03/05053
§ 371 (c)(1),
(2), (4) Date: Jan. 28, 2005

(87) PCT Pub. No.: WO2004/011288
PCT Pub. Date: Feb. 5, 2004

(65) Prior Publication Data
US 2005/0268632 A1 Dec. 8, 2005

(30) Foreign Application Priority Data
Jul. 30, 2002 (JP) .............................. 2002-221858

(51) Int. Cl.
*B60H 1/32* (2006.01)
(52) U.S. Cl. .......................................... 62/236; 62/244
(58) Field of Classification Search .............. 62/228.5, 62/236, 239–244, 133
See application file for complete search history.

(56) References Cited

U.S. PATENT DOCUMENTS

| | | | |
|---|---|---|---|
| 5,507,153 A * | 4/1996 | Seto et al. ..................... | 63/133 |
| 5,635,805 A | 6/1997 | Ibaraki et al. | |
| 5,743,099 A | 4/1998 | Kraynak et al. | |
| 6,782,704 B1 * | 8/2004 | Kuroda et al. ................. | 62/133 |
| 6,840,055 B1 * | 1/2005 | Iritani ......................... | 62/230 |
| 6,973,798 B1 * | 12/2005 | Ikura et al. ................ | 62/228.5 |
| 2001/0015070 A1 | 8/2001 | Hara | |

FOREIGN PATENT DOCUMENTS

| | | |
|---|---|---|
| DE | 44 14 547 A1 | 11/1995 |
| JP | 2000-127753 | 5/2000 |
| JP | 2000-179374 | 6/2000 |
| JP | 2002-47964 | 2/2002 |

* cited by examiner

Primary Examiner—William E. Tapolcai
(74) Attorney, Agent, or Firm—Arent Fox PLLC

(57) ABSTRACT

An air conditioning device for a vehicle having a regenerative section improves efficiency of regeneration. The air conditioning device comprises a compressor (6) connected to an output shaft (1a) of an engine (1) via an electromagnetic clutch (5), a motor-generator (2) for electrically recovering kinetic energy of the vehicle (100) during deceleration, a battery (9) for storing energy regenerated by the motor-generator (2), and a motor-driven compressor (13). When the vehicle (100) is in a deceleration state, the compressor (6) is disconnected from the engine (1) by disengaging the electromagnetic clutch (5), and air conditioning is performed by the motor-driven compressor (13).

6 Claims, 2 Drawing Sheets

AIR CONDITIONING DEVICE FOR VEHICLE

BACKGROUND OF THE INVENTION

1. Field of the Invention

The present invention relates to an air conditioning device for a vehicle which comprises a regenerative section and a battery device.

2. Description of the Related Art

In general, in a vehicle comprising an engine as a power source and an interior air conditioning device, the compressor of the air conditioning device is driven by the engine.

On the other hand, among vehicles having an engine as a power source, a type of vehicle is known in which a control generally known as an idling stop control, in which fuel supply is stopped so as to stop the engine under predetermined conditions such as when the vehicle stops, is executed.

In the case of a conventional vehicle which has an air conditioning device, and in which an idling stop control is executed, an air conditioning operation may not be performed when idling is stopped because the compressor of the air conditioning device cannot be operated.

Another type of vehicle is also known in which an air conditioning operation can be performed even when the engine is stopped. For example, in a vehicle disclosed in Japanese Unexamined Patent Application, First Publication No. 2000-179374, or in a vehicle disclosed in Japanese Unexamined Patent Application, First Publication No. 2002-47964, a compressor is adapted to be selectively driven by an engine and a motor, the engine and the compressor are adapted to be connected or disconnected by engagement or disengagement of a clutch, the clutch is engaged and the compressor is driven solely by the engine or by the engine and motor when the engine runs, and the clutch is disengaged and the compressor is driven solely by the motor.

Another type of vehicle is also known, which comprises a regenerative section for recovering kinetic energy of the vehicle during deceleration as electrical energy, and a battery section for storing electrical energy recovered by the regenerative section, and in which electrical apparatuses such as a motor for a compressor are operated using the electrical energy stored in the battery section.

The above-mentioned vehicle disclosed in Japanese Unexamined Patent Application, First Publication No. 2000-179374 is an example of such type of vehicle, which is a so-called hybrid vehicle, and in which the motor for the compressor is adapted to selectively act as the regenerative section, and as a motor for driving the vehicle as well. In this case, recovery of energy is performed in such a manner that the clutch is engaged so that the kinetic energy of driving wheels is transmitted to the motor, as a regenerative section, via the engine.

In such a vehicle, the compressor is adapted to be selectively driven by the engine and the motor, and the engine and the compressor are adapted to be connected or disconnected by engagement or disengagement of the clutch in order to perform air conditioning even when the engine is stopped; however, because the kinetic energy of the vehicle during deceleration is recovered by the regenerative section with the engine intervening, the clutch must be engaged during a regenerative operation; therefore, the compressor is inevitably driven regardless of the need for air conditioning.

In this case, a problem is encountered in that regenerated energy is reduced due to increase in friction when the compressor is driven during a regenerative operation.

SUMMARY OF THE INVENTION

In consideration of the above circumstances, an object of the present invention is to provide an air conditioning device for a vehicle, which enables air conditioning even when an engine is stopped, and which enables improvement of efficiency in a regenerative operation.

In order to achieve the above object, the present invention provides an air conditioning device for a vehicle comprising: a first compressor for air conditioning which is connected to an output shaft of an engine via a clutch; a regenerative section for recovering kinetic energy of the vehicle during deceleration as electrical energy; a battery section for storing electrical energy recovered by the regenerative section; a second compressor for air conditioning which is driven by a motor using the recovered electrical energy; and an air conditioning control section for controlling air conditioning which is adapted to disconnect the first compressor from the engine during deceleration of the vehicle by disengaging the clutch, and to make the second air compressor be used solely for air conditioning.

According to the air conditioning device configured as described above, because the first compressor is disconnected from the engine when regenerated energy is recovered by the regenerative section, friction during a regenerative operation can be reduced, and the amount of regenerated energy can be increased by the amount corresponding to the reduced friction. In addition, air conditioning may be performed using the second compressor even when the engine is stopped, or when a regenerative operation is performed.

The air conditioning device may further comprise an automatic stop-start engine control section for automatically stopping or starting the engine under predetermined conditions; a priority determining section for determining which of an automatic stop-start control of the engine or an air conditioning operation is given priority; and a desired load determining section for determining a desired air conditioning load, and comparing the desired air conditioning load with a predetermined value, wherein the air conditioning control section may be adapted to make the second compressor be operated solely when the automatic stop-start control of the engine is given priority, and to make the first compressor also be operated, in addition to the second compressor, by engaging the clutch when the air conditioning operation is given priority, and the desired air conditioning load is greater than the predetermined value.

According to the air conditioning device configured as described above, because the second compressor is operated solely for air conditioning when automatic stop-start control of the engine is given priority, air conditioning may be performed even when the engine is automatically stopped. Moreover, because the first compressor is also operated, in addition to the second compressor, when air conditioning operation is given priority, and a desired air conditioning load is greater than a predetermined value, the air conditioning operation is given higher priority than the automatic stop-start control of the engine so that an appropriate air conditioning control may be performed depending on the desired air conditioning load.

In the above air conditioning device, the air conditioning control section may be adapted to compare the efficiencies of the first and second compressors with each other when the air conditioning operation is given priority, when the desired air conditioning load is greater than the predetermined value, and when the desired air conditioning load is covered by operating either one of the first and second compressors, and the air conditioning control section may further be adapted to make the second compressor operate, and to disconnect the first compressor from the engine by disengaging the clutch when the efficiency of the second compressor is greater than that of the first compressor, may be adapted to make the first compressor be operated by the engine by engaging the clutch, and to make the second compressor stop when the efficiency of the second compressor is less than that of the first compressor.

According to the air conditioning device configured as described above, air conditioning may be performed selectively using either one of the first and second compressors, which exhibits a greater efficiency than that of the other, when the desired air conditioning load is covered by operating either one of the first and second compressors.

In the above air conditioning device, the air conditioning control section may be adapted to disconnect the first compressor from the engine by disengaging the clutch, and to make the second compressor be operated when the efficiency of the second compressor is less than that of the first compressor, and when the regenerative section is recovering electrical energy.

According to the air conditioning device configured as described above, when the regenerative section is recovering electrical energy, the regenerative operation is given priority, and air conditioning is performed by solely using the second compressor even when the efficiency of the second compressor is less than that of the first compressor.

In the above air conditioning device, the regenerative section may be adapted to selectively act as a driving motor for driving the vehicle, and may be adapted to use the energy stored in the battery section when acting as the driving motor.

According to the air conditioning device configured as described above, the amount of regenerated energy can be increased in a hybrid vehicle having an engine and a motor as power sources.

In the above air conditioning device, the priority determining section may comprise buttons which are operatable by an operator.

DESCRIPTION OF THE PREFERRED EMBODIMENTS

An embodiment of the air conditioning device for a vehicle according to the present invention will be explained below with reference to FIGS. 1 and 2.

Figure 1:
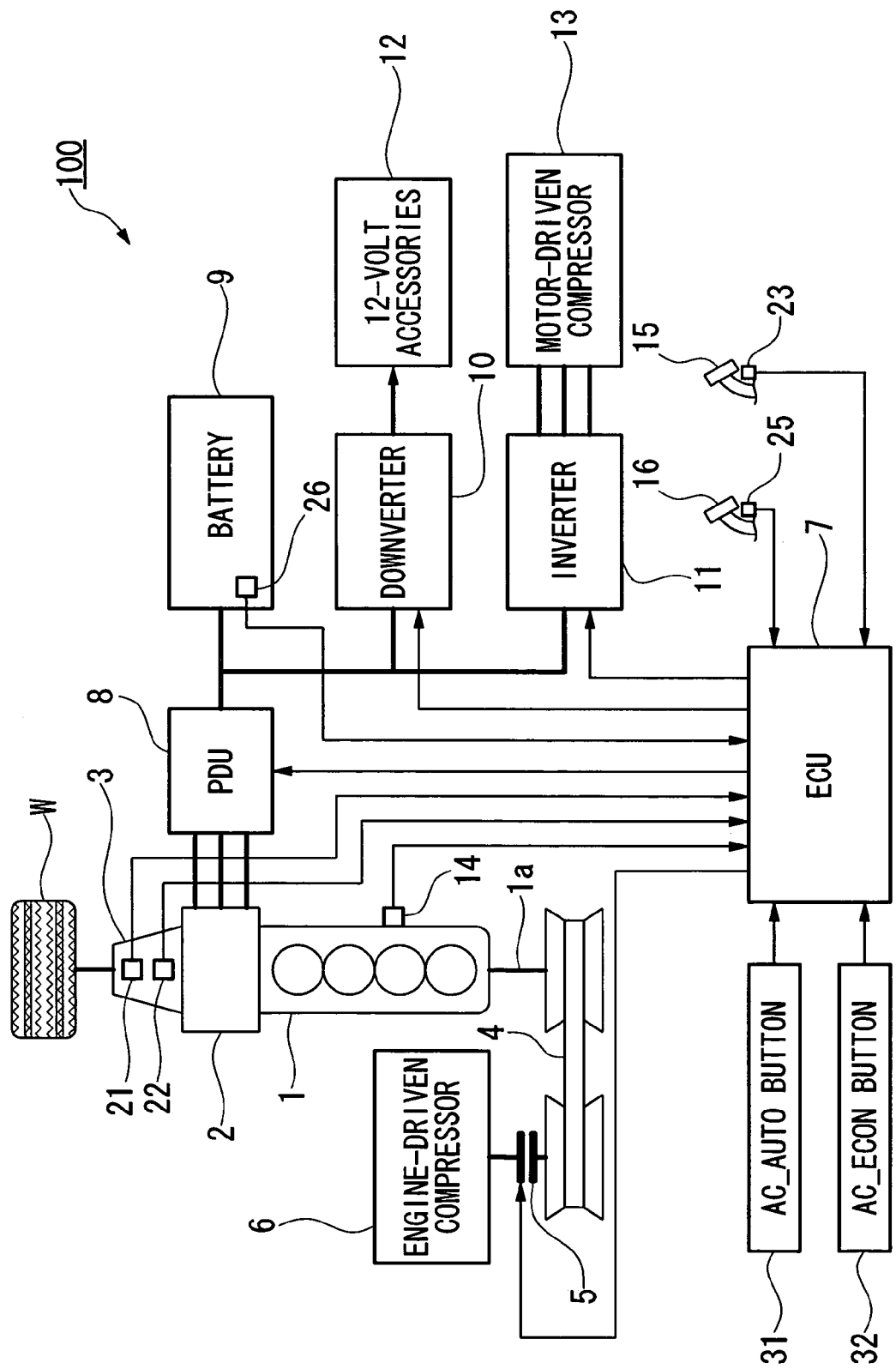
FIG. 1 is a schematic diagram showing the general structure of a hybrid vehicle according to an embodiment, which comprises an air conditioning device for a vehicle of the present invention.

FIG. 1 is a schematic diagram showing the general structure of a parallel type hybrid vehicle 100 comprising the air conditioning device for a vehicle. In the hybrid vehicle 100, an engine 1 and a motor-generator 2 (a regenerative section) as power sources and an automatic transmission 3 are connected in series. The motor-generator 2 is capable of generating electrical power. The driving powers of the engine 1 and motor-generator 2 are transmitted to driving wheels W via the automatic transmission 3. During a deceleration operation of the hybrid vehicle 100, driving power is transmitted from the driving wheels W to the motor-generator 2, and the motor-generator 2 acts as a generator so as to produce regenerative braking force, and so as to recover kinetic energy of the vehicle as electrical energy.

An output shaft 1a of the engine 1 is made connectable to an engine-driven compressor for air conditioning 6 (a first compressor) via a pulley and belt mechanism 4 and an electromagnetic clutch 5. The control operation of the engine-driven compressor 6 is performed by the electromagnetic clutch 5 which is controlled by an ECU 7, i.e., the engine-driven compressor 6 is placed in an operative state (hereinafter, this state may be referred to as "in the ON state") by being connected to the engine 1 when the electromagnetic clutch 5 is engaged, and the engine-driven compressor 6 is placed in an inoperative state (hereinafter, this state may be referred to as "in the OFF state") by being disconnected from the engine 1 when the electromagnetic clutch 5 is disengaged.

The driving operation and regenerative operation of the motor-generator 2 are performed by a power drive unit (PDU) 8 which receives control commands from the ECU 7. A high-voltage battery 9 (a battery section), which electrically communicates with the motor-generator 2, is connected to the power drive unit 8. The battery 9 comprises, for example, a plurality of modules connected in series, each of which comprises a plurality of cells connected in series.

The high-voltage battery 9 is connected to a downverter 10 and to an inverter 11. The downverter 10, which is controlled by the ECU 7, makes the voltage of the battery 9 step-down for energizing various accessories 12 included in a 12-volt system. The DC power of the battery 9 is converted into AC power using the inverter 11 controlled by the ECU 7, and is supplied to a motor-driven compressor for air conditioning 13 (a second compressor).

In this manner, the hybrid vehicle 100 comprises the engine-driven compressor 6 and the motor-driven compressor 13 as compressors for room air conditioning. Note that, in this embodiment, the capacity (capability of cooling) of the engine-driven compressor 6 is set to be greater than that of the motor-driven compressor 13.

The ECU 7 controls a fuel supply control device 14 for controlling the amount of fuel supplied to the engine 1, and the ECU 7 also performs an automatic stop-start control of the engine (generally known as an idling stop control) under predetermined conditions. To this end, the ECU 7 receives various signals such as an output signal from a speed sensor 21 for measuring vehicle speed, an output signal from a shift position sensor 22 for sensing the shift position of the transmission 3, an output signal from a brake switch 23 for detecting the operation of a brake pedal 15, an output signal from an accelerator pedal sensor 25 for measuring the operating degree of an accelerator pedal 16, an output signal from a state of charge sensor 26 for measuring the state of charge of the battery 9, and the like. In this embodiment, the ECU 7 and the fuel supply control device 14 form an automatic stop-start engine control section which automatically stops or starts the engine 1 under predetermined conditions.

Moreover, the hybrid vehicle 100 comprises two buttons (a priority determining section) for air conditioning either one of which is selected by an operator when air conditioning is performed. One of the buttons for air conditioning is an "AC_AUTO" button 31 for giving priority to air conditioning. When the "AC_AUTO" button 31 is selected, the ECU 7 performs a control operation such that, when a desired air conditioning load is greater than a predetermined value, the engine 1 is started so as to operate the engine-driven compressor 6 even when the engine 1 is in an idling stop state. The other of the buttons for air conditioning is an "AC_ECON" button 32 for giving priority to the automatic stop-start control of the engine 1. When the "AC_ECON" button 32 is selected, the ECU 7 performs a control operation such that fuel efficiency is given higher priority than air conditioning, i.e., the engine-driven compressor 6 is placed in an inoperative state, and the motor-driven compressor 13 is operated solely regardless of the magnitude of desired air conditioning load.

Next, the control operation of the compressors for air conditioning in this embodiment will be explained with reference to the flowchart shown in FIG. 2.

Figure 2:
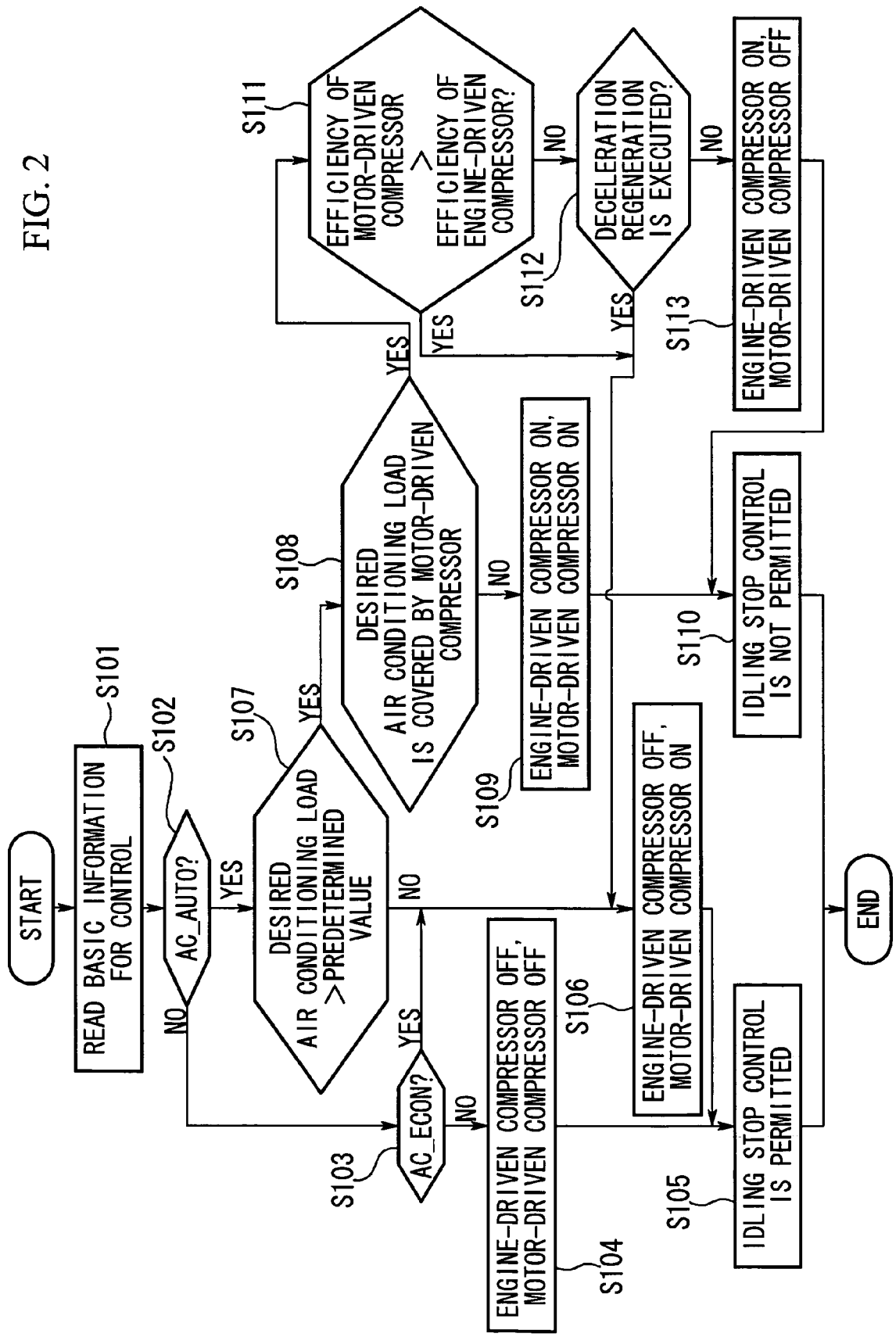
FIG. 2 is a flowchart showing a control operation for compressors for air conditioning included in the embodiment.

The flowchart shown in FIG. 2 shows a routine of the control operation of the compressors for air conditioning. The routine of the control operation of the compressors for air conditioning is repeatedly and periodically executed by the ECU 7.

In step S101, basic information for control, such as vehicle speed, shift position, operating degree of the accelerator pedal 16, room temperature, ambient temperature, etc., is read in.

Next, the control operation proceeds to step S102, in which it is determined whether the "AC_AUTO" button 31 is selected.

When the result of the determination in step S102 is "NO", the operation proceeds to step S103, in which it is determined whether the "AC_ECON" button 32 is selected.

When the result of the determination in step S103 is "NO", which means that air conditioning is not required, the operation proceeds to step S104, in which both of the engine-driven compressor 6 and the motor-driven compressor 13 are placed in the inoperative state (in the OFF state), and then the operation proceeds to step S105, in which an idling stop control permission is enforced, and then the control routine is once terminated. The engine-driven compressor 6 is placed in the inoperative state in such a manner that the electromagnetic clutch 5 is disengaged so as to disconnect the engine-driven compressor 6 from the engine 1 (hereinafter, the same explanation will not be repeated).

When the result of the determination in step S103 is "YES", i.e., the "AC_ECON" button 32 is selected, which means that the automatic stop-start control of the engine 1 is given priority, the operation proceeds to step S106, in which the motor-driven compressor 13 is solely placed in the operative state (in the ON state), and the engine-driven compressor 6 is placed in the inoperative state (in the OFF state), and then the operation proceeds to step S105, in which the idling stop control permission is enforced, and then the control routine is once terminated. In other words, in this case, fuel efficiency is given higher priority than air conditioning, i.e., when the idling stop control is permitted, the engine-driven compressor 6 is not operated, and the motor-driven compressor 13 is operated solely for air conditioning regardless of the magnitude of desired air conditioning load. Accordingly, air conditioning can be performed by the motor-driven compressor 13 even when the engine 1 is stopped.

In contrast, when the result of the determination in step S102 is "YES", i.e., the "AC_AUTO" button 31 is selected, which means that the air conditioning operation is given priority, the operation proceeds to step S107, in which it is determined whether the desired air conditioning load is greater than a predetermined value.

When the result of the determination in step S107 is "NO" (i.e., the desired air conditioning load≦a predetermined value), the operation proceeds to step S106, in which the motor-driven compressor 13 is solely placed in the operative state (in the ON state), and the engine-driven compressor 6 is placed in the inoperative state (in the OFF state), and then the operation proceeds to step S105, in which the idling stop control permission is enforced, and then the control routine is once terminated. In other words, in this case, because the desired air conditioning load is small, the motor-driven compressor 13 alone satisfies the desired air conditioning load.

When the result of the determination in step S107 is "YES" (i.e., the desired air conditioning load>a predetermined value), the operation proceeds to step S108, in which it is determined whether or not the motor-driven compressor 13 alone satisfies desired air conditioning load.

When the result of the determination in step S108 is "NO", which means that the motor-driven compressor 13 alone does not suffice the desired air conditioning load, the operation proceeds to step S109, in which both of the engine-driven compressor 6 and the motor-driven compressor 13 are placed in the operative state (in the ON state) so that a sufficient cooling capacity corresponding to the desired air conditioning load can be obtained by the compressors 6 and 13. Then the operation proceeds to step S110, in which the idling stop control permission is not enforced, and the control routine is once terminated. In other words, in this case, the engine 1 is started, the electromagnetic clutch 5 is engaged, and the engine-driven compressor 6 is also operated even when the conditions for the idling stop operation for the engine 1 are satisfied.

When the result of the determination in step S108 is "YES", which means that the motor-driven compressor 13 alone satisfies the desired air conditioning load, the operation proceeds to step S111, in which it is determined whether or not an air conditioning efficiency in the case in which the motor-driven compressor 13 is operated solely is greater than that in the case in which the engine-driven compressor 6 is operated solely.

The air conditioning efficiency or the efficiency of the compressor may be defined by the amount of energy consumed for obtaining a predetermined calorific power for air conditioning. The amount of energy may be defined by the amount of fuel consumed in the case of the engine-driven compressor 6, and the amount of energy may be defined by electrical power in the case of the motor-driven compressor 13.

A map, which defines the relationships among the efficiencies of the compressors 6 and 13, a desired air conditioning load, and engine revolution rate, may be prepared and stored in the ECU 7 so that one of the engine-driven compressor 6 and the motor-driven compressor 13 is preferably selected depending on current conditions such as desired air conditioning load, the engine revolution rate, and the like. Because, in general, the fuel efficiency of an engine is better in higher revolution rates, the engine-driven compressor 6 is preferably selected when the engine revolution rate is relatively high.

When the result of the determination in step S111 is "YES", which means that the motor-driven compressor 13 exhibits greater efficiency, the operation proceeds to step S106, in which the motor-driven compressor 13 is solely placed in the operative state (in the ON state), and the engine-driven compressor 6 is placed in the inoperative state (in the OFF state), and then the operation proceeds to step S105, in which the idling stop control permission is enforced, and then the control routine is once terminated.

When the result of the determination in step S111 is "NO", which means that the engine-driven compressor 6 exhibits greater efficiency, the operation proceeds to step S112, in which it is determined whether or not a regenerative operation during deceleration is being executed.

When the result of the determination in step S112 is "NO", which means that the regenerative operation during deceleration is not being executed, the operation proceeds to step S113, in which the engine-driven compressor 6 is solely placed in the operative state (in the ON state), and the motor-driven compressor 13 is placed in the inoperative state (in the OFF state), and then the operation proceeds to step S110, in which the idling stop control permission is not enforced, and then the control routine is once terminated.

As explained above, when the desired air conditioning load is covered by operating either one of the engine-driven compressor 6 and the motor-driven compressor 13, one of the compressors, which exhibits greater efficiency, is selected and operated, whereby energy consumption is reduced, and the fuel efficiency of the hybrid vehicle 100 can be improved.

In contrast, when the result of the determination in step S112 is "YES", which means that the regenerative operation during deceleration is being executed, the operation proceeds to step S106, in which the motor-driven compressor 13 is solely placed in the operative state (in the ON state), and the engine-driven compressor 6 is placed in the inoperative state (in the OFF state), and then the operation proceeds to step S105, in which the idling stop control permission is enforced, and then the control routine is once terminated. More specifically, if the engine-driven compressor 6 is operated when the regenerative operation during deceleration is executed, the amount of regenerated energy is decreased by the amount corresponding to the increased friction; therefore, in this embodiment, when the regenerative operation during deceleration is executed, the motor-driven compressor 13 is operated solely for air conditioning even though it is determined that the engine-driven compressor 6 exhibits greater efficiency (in other words, it is determined that the motor-driven compressor 13 exhibits lower efficiency).

According to the above control operation, the amount of regenerated energy can be increased, whereby efficiency of regeneration can be improved, and fuel efficiency can be improved. In addition, because the motor-driven compressor 13 is directly operated by regenerated energy, the charging/discharging loss of the battery 9 may be reduced, and the energy of the battery 9 may be effectively used. Furthermore, the engine 1 may be stopped without unnatural feeling.

In this embodiment, an air conditioning control section is configured by executing the control operations in steps S101 to S113.

Other Embodiments

The present invention is not limited to the above embodiment.

For example, the present invention may be applicable to a vehicle in which just an engine is employed for a power source, even though the present invention is applied to a hybrid vehicle in which an engine and a motor are employed for power sources.

Moreover, the battery 9 as the battery section may be replaced by a capacitor.

INDUSTRIAL APPLICABILITY

As explained above, according to the air conditioning device for a vehicle of the present invention, because the first compressor is disconnected from the engine when regenerated energy is recovered by the regenerative section, friction during a regenerative operation can be reduced, and the amount of regenerated energy can be increased by the amount corresponding to the reduced friction, i.e., efficiency of regeneration can be improved. In addition, air conditioning may be performed using the second compressor even when the engine is stopped, or when a regenerative operation is performed.

According to another air conditioning device for a vehicle of the present invention, because the second compressor is operated solely for air conditioning when the automatic stop-start control of the engine is given priority, air conditioning may be performed even when the engine is automatically stopped. Moreover, because the first compressor is also operated, in addition to the second compressor, when air conditioning operation is given priority, and a desired air conditioning load is greater than a predetermined value, the air conditioning operation is given higher priority than the auto-stop-start control of the engine so that an appropriate air conditioning control may be performed depending on the desired air conditioning load.

According to another air conditioning device for a vehicle of the present invention, because air conditioning may be performed selectively using either one of the first and second compressors, which exhibits a greater efficiency than that of the other, when the desired air conditioning load is covered by operating either one of the first and second compressors, energy consumption may be reduced.

According to another air conditioning device for a vehicle of the present invention, when the regenerative section is recovering electrical energy, the regenerative operation is given priority, and air conditioning is performed by solely using the second compressor even when the efficiency of the second compressor is less than that of the first compressor.

According to another air conditioning device for a vehicle of the present invention, the amount of regenerated energy can be increased in a hybrid vehicle having an engine and a motor as power sources, and as a result, efficiency of regeneration can be improved, and fuel efficiency of the vehicle can be improved.

The invention claimed is:

1. An air conditioning device for a vehicle comprising:
    a first compressor for air conditioning which is connected to an output shaft of an engine via a clutch;
    a regenerative section for recovering kinetic energy of the vehicle during deceleration as electrical energy;
    a battery section for storing electrical energy recovered by the regenerative section;
    a second compressor for air conditioning which is driven by a motor using the recovered electrical energy; and
    an air conditioning control section for controlling air conditioning which is adapted to disconnect the first compressor from the engine during deceleration of the vehicle by disengaging the clutch, and to make the second compressor be used solely for air conditioning.

2. An air conditioning device as claimed in claim 1, further comprising:
    an automatic stop-start engine control section for automatically stopping or starting the engine under predetermined conditions;
    a priority determining section for determining which of an automatic stop-start control of the engine or an air conditioning operation is given priority; and a desired air conditioning load determining section for determining a desired air conditioning load, and comparing the desired air conditioning load with a predetermined value, wherein the air conditioning control section is adapted to make the second compressor be operated solely when the automatic stop-start control of the engine is given priority, and to make the first compressor also be operated, in addition to the second compressor, by engaging the clutch when the air conditioning operation is given priority, and the desired air conditioning load is greater than the predetermined value.

3. An air conditioning device as claimed in claim 2, wherein the air conditioning control section is adapted to compare the efficiencies of the first and second compressors with each other when the air conditioning operation is given priority, when the desired air conditioning load is greater than the predetermined value, and when the desired air conditioning load is covered by operating either one of the first and second compressors, and wherein the air conditioning control section is adapted to make the second compressor operate, and to disconnect the first compressor from the engine by disengaging the clutch when the efficiency of the second compressor is greater than that of the first compressor, and is adapted to make the first compressor be operated by the engine by engaging the clutch, and to make the second compressor stop when the efficiency of the second compressor is less than that of the first compressor.

4. An air conditioning device as claimed in claim 3, wherein the air conditioning control section is adapted to disconnect the first compressor from the engine by disengaging the clutch, and to make the second compressor be operated when the efficiency of the second compressor is less than that of the first compressor, and when the regenerative section is recovering electrical energy.

5. An air conditioning device as claimed in claim 3, wherein the regenerative section is adapted to selectively act as a driving motor for driving the vehicle, and is adapted to use the energy stored in the battery section when acting as the driving motor.

6. An air conditioning device as claimed in claim 2, wherein the priority determining section comprises buttons which are operatable by an operator.

* * * * *